United States Patent [19]

Rohwedder

[11] Patent Number: 4,714,398
[45] Date of Patent: Dec. 22, 1987

[54] DRIVE ARRANGEMENT FOR A COMBINE HARVESTER UNLOADING AUGER

[75] Inventor: Helmut Rohwedder, Zweibrucken, Fed. Rep. of Germany

[73] Assignee: Deere & Company, Moline, Ill.

[21] Appl. No.: 802,657

[22] Filed: Nov. 27, 1985

[30] Foreign Application Priority Data

Dec. 7, 1984 [EP] European Pat. Off. ........ 84114894.3

[51] Int. Cl.$^4$ ............................................. B65G 67/24
[52] U.S. Cl. ................................... 414/503; 414/526; 414/523; 198/668; 198/589; 198/313
[58] Field of Search ............... 414/523, 526, 503, 504, 414/505; 198/313, 587, 589, 668; 56/473.5

[56] References Cited

U.S. PATENT DOCUMENTS

| | | | |
|---|---|---|---|
| 1,777,017 | 9/1930 | Roesch et al. | 198/589 |
| 1,953,032 | 3/1934 | Turner | 198/589 |
| 3,410,389 | 11/1968 | Ashton et al. | 414/523 X |
| 3,561,681 | 2/1971 | Tyler | 414/523 X |
| 3,664,525 | 5/1972 | Herbsthofer | 414/526 X |
| 3,872,982 | 3/1985 | Rowland-Hill et al. | |
| 3,938,684 | 2/1976 | Quoifry et al. | 414/526 X |
| 4,093,087 | 6/1978 | De Coene | 414/523 |

FOREIGN PATENT DOCUMENTS

| | | |
|---|---|---|
| 2036301 | 2/1971 | Fed. Rep. of Germany . |
| 1960798 | 6/1971 | Fed. Rep. of Germany . |
| 2700577 | 7/1978 | Fed. Rep. of Germany . |
| 2256715 | 8/1975 | France . |
| 2356355 | 1/1978 | France . |
| 1576571 | 1/1978 | United Kingdom . |

*Primary Examiner*—Frank E. Werner

[57] ABSTRACT

Drive transmission from the bottom auger of a combine grain tank to an outwardly and upwardly inclined swinging unloading auger-conveyor by means of (sequentially) a telescoping, double U-jointed drive shaft, an acute angle bevel gear box, and a jack shaft, permit the enclosure of the drive components in a compact housing while retaining a desirably, relatively unobstructed flow channel from the grain tank into the unloading conveyor housing. Bevel gear box and U-joint locations are chosen so that the unloading auger may be driven, if desired, in any position in its normal range of swing.

20 Claims, 6 Drawing Figures

4,714,398

DRIVE ARRANGEMENT FOR A COMBINE HARVESTER UNLOADING AUGER

BACKGROUND OF THE INVENTION

This invention concerns an arrangement for grain transfer and drive connection between a delivery auger in the grain tank of a combine and an external unloading conveyor and, more particularly, for a combine unloading conveyor system in which the unloading conveyor swings between an outwardly and an upwardly inclined normal operating position and an approximately horizontal, inactive position in which the conveyor lies alongside the side of the combine or grain tank.

It is common practice in combine harvesters to deliver grain from the tank by means of a horizontal auger in the bottom of the tank, typically extending transversely and delivering directly to an outwardly and upwardly extending unloading auger conveyor which may include a boot or enlarged housing to receive the grain from the tank. It is also common practice to drive the external unloading auger from the internal delivery auger, the drive connection usually including a bevel gear box. If the bevel gear box is mounted internally at the elbow or angle between the two auger portions, it tends to obstruct the flow of grain; and swinging or pivoting of the external auger about the elbow, between an extended operating position and a retracted or horizontal transport position is not easily arranged.

In a somewhat more practical arrangement, the bevel gear box is moved to the outside of the conveyor channel and one of its drive shafts is made coaxial with the pivot axis of the unloading conveyor portion. The drive connection is completed using suitable jack shaft and drive transfer arrangements, such as a V-belt or chain. West German published patent application No. 2,700,577 (Roderfeld) discloses an example of such an arrangement. Taking a large part of the drive system out of the conveyor channels potentially reduces obstructions to grain flow. However, the accompanying displacement of the pivot axis for the external unloading conveyor results in large relative movement between the fixed and pivoted conveyor portions during pivoting so that a correspondingly large inlet must be maintained in the boot of the unloading conveyor (or a large outlet from the grain tank) to ensure sufficient register to maintain an adequate flow channel at all times. The form of the transition from delivery auger to unloading conveyor thus becomes more bulky and unsightly, with a corresponding increase in cost and weight.

SUMMARY OF THE INVENTION

Accordingly, an object of the invention is to provide a transition arrangement in the unloading system of the grain tank of a combine harvester which is compact and relatively low in manufacturing cost and, in which most of the drive arrangement is housed within a compact boot of the unloading conveyor while minimizing the intrusion of drive components into the conveyor channels. This is accomplished, in part, and in a preferred embodiment, by using a combination of a flexible, universally jointed connecting drive shaft, an acute angled bevel gear case and a jack shaft providing final drive to the unloading auger. The gear case is disposed so that angularity of the universal joints in the connecting drive shaft remain at acceptable levels throughout the swing range of the unloading conveyor.

In the preferred embodiment, the unloading conveyor includes a boot having an upper wall with an inlet surrounded by a turntable track which mates with a corresponding track or retainer surrounding an outlet aperture in an outwardly and downwardly sloping wall portion of the grain tank and defines a pivot axis for the swing of the unloading conveyor. The flexible (universally jointed) drive shaft from the delivery auger spans or straddles the pivot axis so defined, and the gear box is disposed outwardly and to the side of the pivot axis and beyond the inlet aperture of the boot and so that only the flexible connecting shaft traverses the conveyor channel between the delivery point of the tank delivery auger and the boot inlet.

In keeping with the invention, the jack shaft for finally driving the unloading auger and the gear box may be substantially offset from the pivot axis of the unloading conveyor boot so that when the unloading conveyor is folded down alongside the grain combine or tank for transport, the jack shaft and gear box are on the outside of the unloading conveyor boot with respect to the grain tank of the machine. When, as is typical, the swing range for the unloading conveyor is about 90 degrees, such a gear box position will result in less than approximately 45 degrees angularity of the universal joints of the connecting drive shaft so that when the unloading conveyor is moved into unloading position from the transport position, the jointed connecting shaft will swing across the pivot axis of the unloading auger boot, setting up angularity in the universal joints in the opposite direction but maintaining relatively small effective angularity in the universal joints so that the conveyor system remains driveable in all swing positions of the unloading auger.

The drive configuration of this invention makes it feasible to enclose the principal members (the jack shaft and gear box being mounted within the boot and the flexible connecting shaft extending into the boot from the tank aperture) without requiring a bulky transition (boot) housing.

DESCRIPTION OF THE PREFERRED EMBODIMENT

Figure 1:
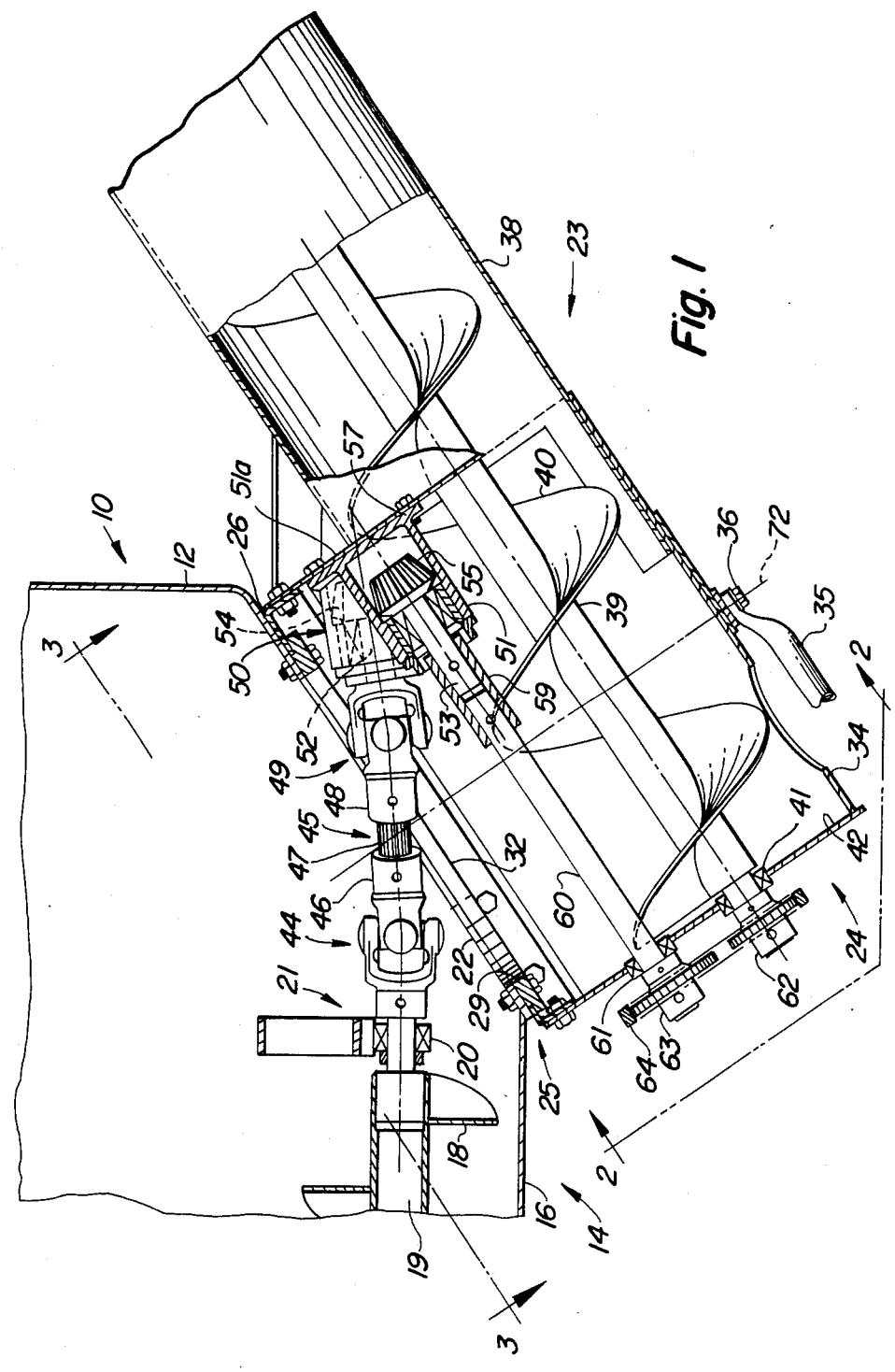
FIG. 1 is a sectional, semi-schematic partial view of a combine harvester embodying the invention, looking rearwardly at a portion of the grain tank and unloading conveyor system, with the unloading conveyor extended into a typical operating or unloading position.
Figure 2:
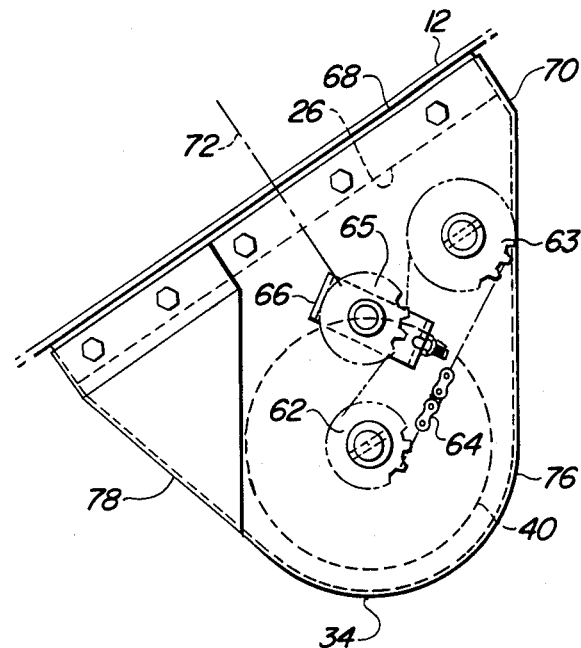
FIG. 2 is a partial end view of the unloading conveyor boot taken approximately on line 2—2 of FIG. 1 and showing the transfer drive chain between the jack shaft and the unloading auger.

The invention is embodied in an otherwise conventional combine harvester, only a pertinent portion of which is shown in the drawings.

The combine grain tank 10 has a right-hand, fore-and-aft extending sidewall 12 and a transversely extending V-bottom 14 defining a trough 16. A delivery auger 18, extending in this trough 16, has a coaxial shaft 19 supported at its outward or delivery end in bearings 20 carried by a mounting arrangement 21. A circular opening 22 provides an outlet from the tank.

The unloading conveyor including a lower housing portion or boot 24, is supported for swiveling about swivel or pivot axis 72 on a turntable or swivel arrangement 25 registering with the tank opening 22. The tank carries a fixed flange portion 29 of the swivel mating with a flange portion 26 carried by the boot 24. The support of the unloading auger assembly is stabilized by a brace 35 attached at one end to the combine frame (not shown) and pivotably attached to the underside 34 of the boot 24 by suitable pivot hardware 36. The unloading auger is housed in a tube 38 connected to the boot 24 and extends into the boot. Flighting 40 is carried on an auger shaft 39, journalled in a bearing 41 in an end wall 42 of the boot 24.

The first member in the drive transfer between the delivery auger shaft 19 and the unloading auger shaft 39 is a first intermediate shaft assembly 45 including a pair of universal joint assemblies 44 and 49, respectively, connected at one end to the delivery auger shaft 19 and at the opposite end to a bevel gear box 50. Mating splines on the shaft itself 47 and in the hubs 46, 48 of the universal joints 44, 49, respectively, permit relative telescopic movement between the opposite U-joints.

The bevel gear box 50 includes a housing 51, an input shaft 52 and an output shaft 53, and includes bevel gear wheels 54 and 55. The gear box 50 is mounted by suitable hardware by a flange 57 of the housing 51 to an upper or forward wall 51a of the boot 24.

A second intermediate shaft or jack shaft 60 is coupled to the gear box output shaft 53 by a sleeve coupler 59 and journalled in the bottom wall 42 of the boot 24 by bearings 61. The final link in the drive connection between the two auger portions is by roller chain 64, tensioned by chain tensioning idler 65 carried in bracket 66 and engaging sprockets 62 and 63, carried respectively by the auger shaft 39 and the jack shaft 60.

In unloading operation, the delivery auger 18 is driven from the combine engine by suitable drive means (not shown) so that the auger flighting augers grain towards the tank outlet 22. Power is transmitted to the unloading auger (flighting 40) by way of the intermediate or flexible connecting shaft assembly 45, the bevel gear box 50, the jack shaft 60 and the chain (chain 64 on sprockets 62, 63).

Figure 3:
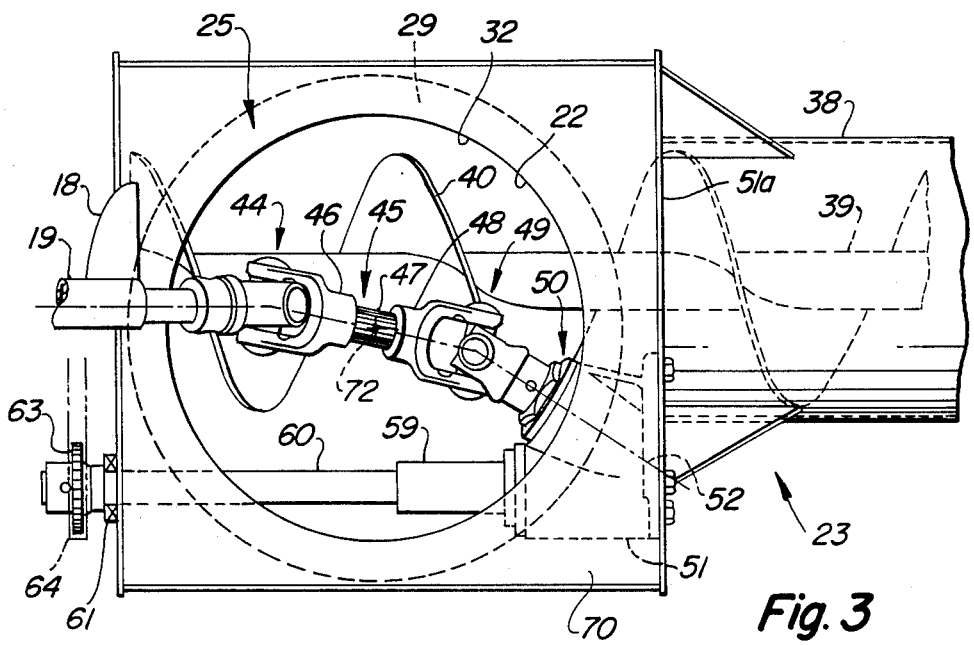
FIG. 3 is an "overhead" view taken approximately on line 3—3 of FIG. 1 with the unloading conveyor extending laterally in its usual unloading position.

In the normal unloading position of the unloading conveyor shown in FIGS. 1 and 3, the axes of rotation of the delivery auger (shaft 19) and the unloading auger (axis of rotation 71) lie in approximately the same plane transverse to the combine harvester. Also in this configuration, the same plane includes the pivot axis 72 of the unloading conveyor relative to the grain tank (as seen best in FIG. 3). In this position of the unloading conveyor, grain can flow freely from the tank through tank opening 22 and through the inlet 32 of the boot 24 into engagement with the auger flighting 40. The flexible shaft assembly 45, although generally in this flow path, is of small bulk and offers little impedance to grain flow; and the jack shaft 60 and bevel gear case 50, although within the boot 24, are situated closely up under the top wall 68 of the boot and to the side of the grain flow channel defined by the openings 22 and 32 so that they, themselves, offer virtually no impedance to grain flow. The bevel gear box 50 is located in an upper and outer corner 70 of the boot and the jack shaft 60 is approximately tangential to the swivel openings (22, 32).

The disposition of the bevel gear case 50 and the jack shaft 60 in their offset position (to the right in terms of direction of grain flow) and the acute angle between the gear case input and output shafts 52, 53 produce a particular range of angularity in the U-joints 44 and 49 and, as shown in FIG. 3, has the U-joints approximately straddling the pivot axis 72 of the unloading conveyor. It can be seen from FIG. 3 that the unloading auger may be swung relatively further forward without inducing an unacceptable angularity in the U-joints. The drawings also show (FIGS. 4 and 5) that the unloading auger assembly may be swung through the remainder of its swing range back to the transport or inactive position (FIG. 5) in which the unloading auger is lying roughly fore-and-aft alongside the grain tank or combine body and that the angularity of the U-joints is still sufficiently small to make it practical to continue to drive the unloading auger, if desired.

Figure 4:
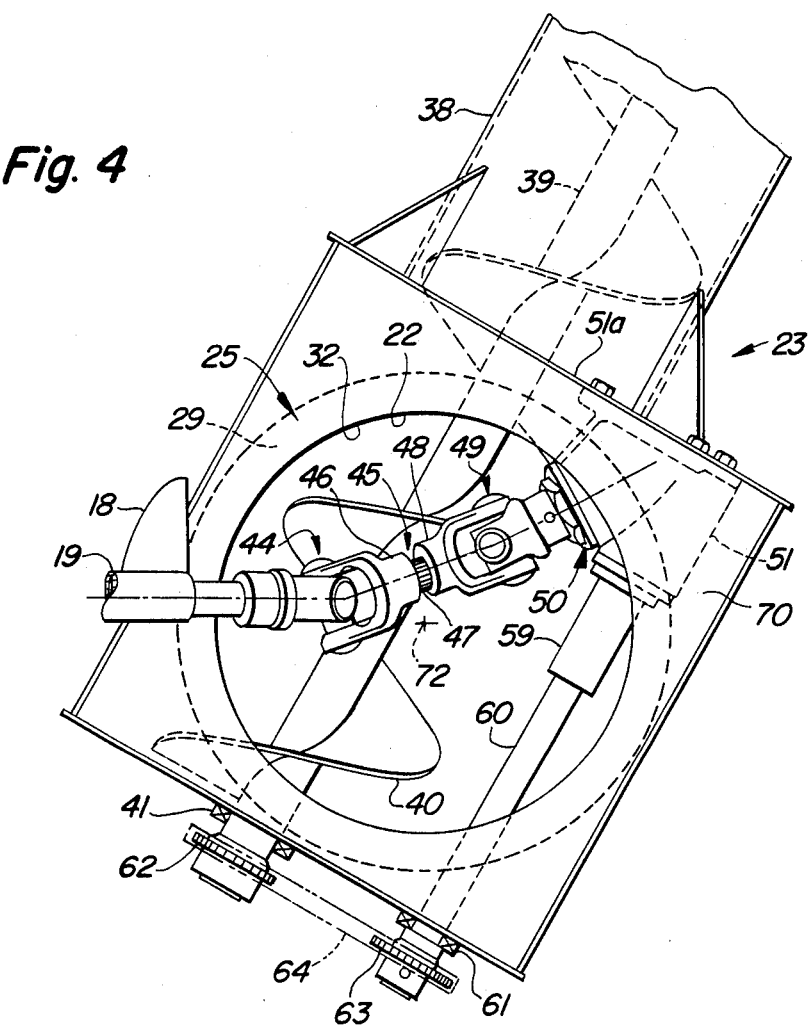
FIG. 4 is a view similar to FIG. 3 with the unloading augers swung towards the rear of the combine part way between the extended operating position and a retracted transport position.
Figure 5:
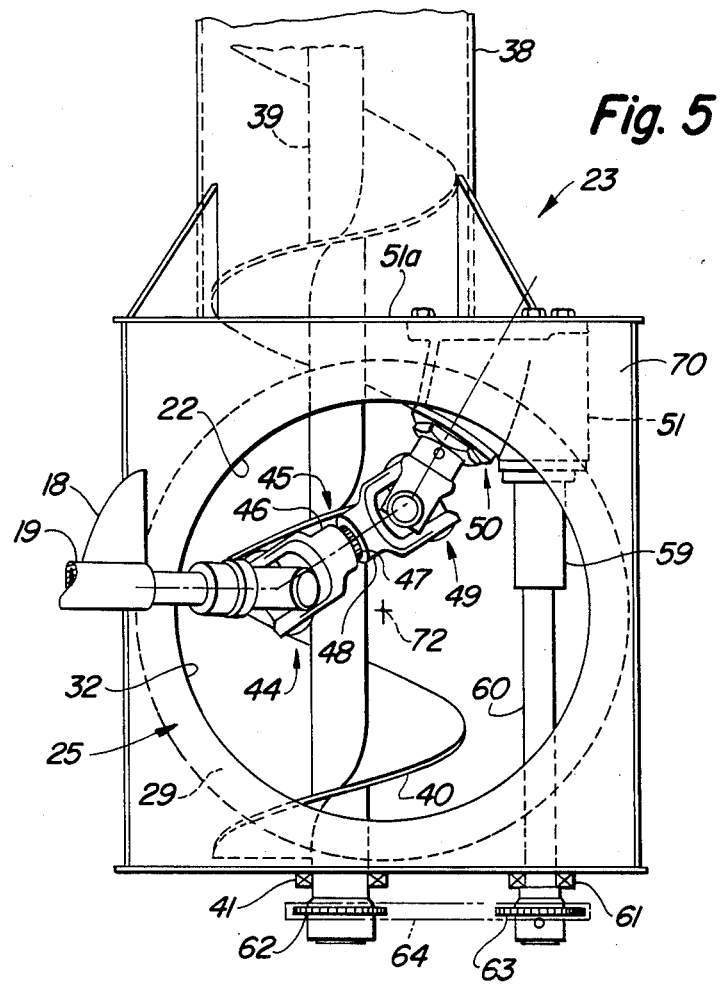
FIG. 5 is another view similar to FIG. 3 with the unloading conveyor swung to the rear.
Figure 6:
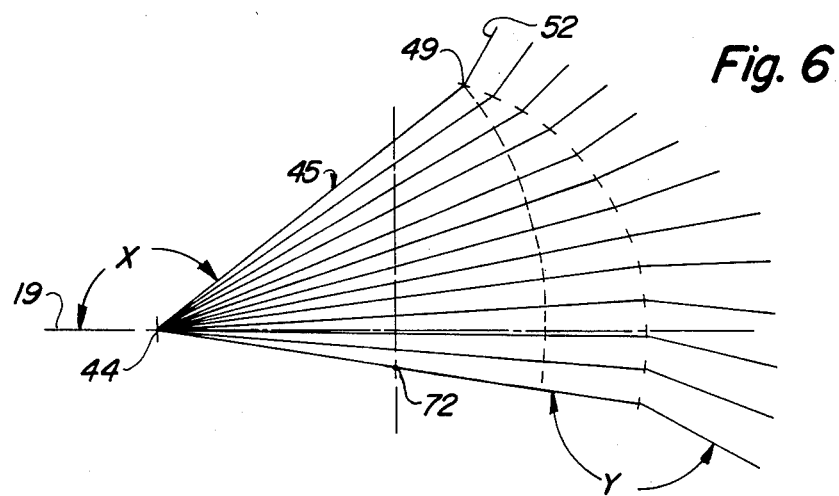
FIG. 6 is a diagram indicating the change in length and angularity of the flexible double universal jointed shaft as the unloading conveyor is swung between the fully extended operating position and a retracted or inactive position.

FIG. 6 diagrams the relative alignment of universal joints 44, 49 and telescoping length of shaft 45 over the range of swing of the unloading conveyor 23 represented by FIGS. 3, 4 and 5. It can be seen that joints remain approximately equi-angular throughout this swing (angles X, Y). Thus, as is well understood, power will be transmitted from the delivery auger shaft 19 to the unloading auger shaft 39 at substantially uniform speed, avoiding potentially damaging accelerations.

The upper wall 68 of the boot 24, as shown, for example, in FIG. 3, is roughly rectangular and its longitudinal sidewalls 76 and 78 converge to the arcuate bottom floor 34 of the boot assembly. The result is a compact housing occupying, in cross-section, little more bulk than that of the auger tube (38) itself and completely enclosing the principal drive transfer members—flexible shaft assembly 45, bevel gear box 50 and jack shaft 60, making the whole assembly compact and neat in appearance and minimizing cost of manufacture and weight, while permitting efficient transfer of grain from the tank into the unloading auger.

What is claimed is:

1. An unloading arrangement for the grain tank of a combine harvester including a delivery auger within the tank having a delivery end for delivering grain to an aperture in a wall of the tank, and an external unloading conveyor outwardly and upwardly extending when in unloading operation and having an unloading auger within a housing, said housing including a boot portion having an inlet in a grain-receiving relationship with the tank wall aperture and means for pivotably supporting the unloading conveyor for swinging about a pivot axis, said pivot axis passing through said inlet, the delivery auger being drivably connected to the unloading auger by drive means including first and second intermediate shafts, and a bevel gear box characterized in that:

the first intermediate shaft comprises a telescoping shaft assembly having a universal joint at each end, one of said joints being connected to the delivery auger delivery end and in that the second intermediate shaft and the gear box are carried by the boot portion substantially laterally offset from the unloading conveyor pivot axis, the gear box including an input connected to the other of said universal joints and an output connected to the second intermediate shaft, and in that the distance between the delivery auger end and the gear box varies as the unloading conveyor swings.

2. The unloading arrangement of claim 1, wherein the second intermediate shaft is disposed within the boot portion close to the pivotable support means.

3. The unloading arrangement of claim 1, wherein the second intermediate shaft and the axis of rotation of the unloading auger are disposed on opposite sides of the pivot axis of the unloading conveyor boot portion and the perpendicular distance of the second intermediate shaft from the pivot axis of the boot portion is greater than that of the unloading auger rotational axis.

4. The unloading arrangement of claim 1, wherein the perpendicular distance between the axis of rotation of the unloading auger and the pivot axis of the boot portion is less than the radius of the unloading auger.

5. The unloading arrangement of claim 1, wherein the perpendicular distance between the second intermediate shaft and the boot portion pivot axis is greater than the radius of the unloading auger.

6. The unloading arrangement of claim 1 wherein the respective axes of rotation of the delivery auger and the unloading auger approximately intersect the boot portion pivot axis.

7. The unloading arrangement of claim 1 wherein the gear box is spaced from the pivot axis of the boot portion.

8. The unloading arrangement of claim 1 wherein the first and second intermediate shafts and the gear box are enclosed by the boot portion.

9. In a conveyor arrangement for transferring grain from an internal delivery auger of a grain tank to an external unloading conveyor, the grain tank having a sidewall with an aperture and the delivery auger extending approximately horizontal and terminating in a delivery auger shaft adjacent the aperture and the unloading conveyor including a grain-receiving boot and an unloading conveyor tube extending from the boot and an unloading auger extending from the tube into the boot for rotation about an unloading auger longitudinal axis, the boot having an upper wall including an inlet and carrying a circular turntable track substantially surrounding and defining the inlet, and means for pivotably supporting and guiding the track so as to define a pivot axis for the unloading conveyor with the boot inlet registering at least partially with the aperture in the grain tank and so that the unloading conveyor is swingable about the pivot axis in a swing range, at least between an unloading position, in which the unloading conveyor extends outwards and upwards from the tank aperture and an inactive position in which the conveyor lies alongside the tank sidewall, a drive arrangement for connecting the delivery auger to the unloading auger, comprising:

a jack shaft carried by the boot and extending approximately parallel to the longitudinal axis of the unloading auger but substantially laterally offset from the unloading conveyor pivot axis;

drive means connected between the jack shaft and the unloading auger;

a bevel gear case carried by the boot, spaced from the unloading conveyor pivot axis so that the distance between the delivery auger end and the gear box varies as the unloading conveyor swings and having an output drivably connected to the jack shaft and an input; and a flexible connecting drive shaft connecting the delivery auger shaft to the input of the gear case and operable to maintain a drivable connection between the delivery auger and the input throughout the swing range.

10. The drive arrangement of claim 9 wherein the connecting drive shaft comprises a telescoping shaft extending between a pair of universal joints at its opposite ends, connected respectively to the delivery auger shaft and the gear case input.

11. The drive arrangement of claim 10 wherein the connecting drive shaft extends adjacent the pivot axis of the boot and the respective universal joints are disposed on opposite sides of the axis.

12. The drive arrangement of claim 9 wherein, in the unloading position, the axes of the unloading auger and the delivery auger are approximately coplanar.

13. The drive arrangement of claim 12 wherein, in the unloading conveyor, the rotational axis of the unloading auger is offset from the pivot axis of the boot by an amount less than the radius of the unloading auger.

14. The drive arrangement of claim 9 wherein the jack shaft and gear case are offset from the pivot axis of the boot and wherein, in the unloading position, the connecting drive shaft approximately intersects the pivot axis of the boot.

15. The drive arrangement of claim 9 wherein the jack shaft is offset laterally from the unloading auger axis in a direction such that, in the inactive position of the unloading conveyor, the jack shaft is disposed on the outer side of the boot with respect to the grain tank.

16. The drive arrangement of claim 9 wherein the lateral spacing between the pivot axis of the boot and the jack shaft is approximately equal to the radius of the turntable track.

17. The drive arrangement of claim 16 wherein the jack shaft is disposed within the boot and adjacent the upper wall of the boot.

18. The drive arrangement of claim 9 wherein the boot upper wall is approximately rectangular and wherein the gear case is carried within the boot and disposed, with reference to the tank wall, adjacent an outer corner of the boot upper wall.

19. The drive arrangement of claim 18 wherein the input and output of the gear case are provided with input and output shafts, respectively, and the input shaft is disposed at an acute angle with respect to the output shaft.

20. The unloading arrangement of claim 1 wherein the input and output of the gear box include respectively, input and output shafts defining between them an acute angle.

* * * * *